No. 735,017. PATENTED JULY 28, 1903.
G. W. HAWES.
FOUNTAIN.
APPLICATION FILED MAR. 30, 1903.
NO MODEL.
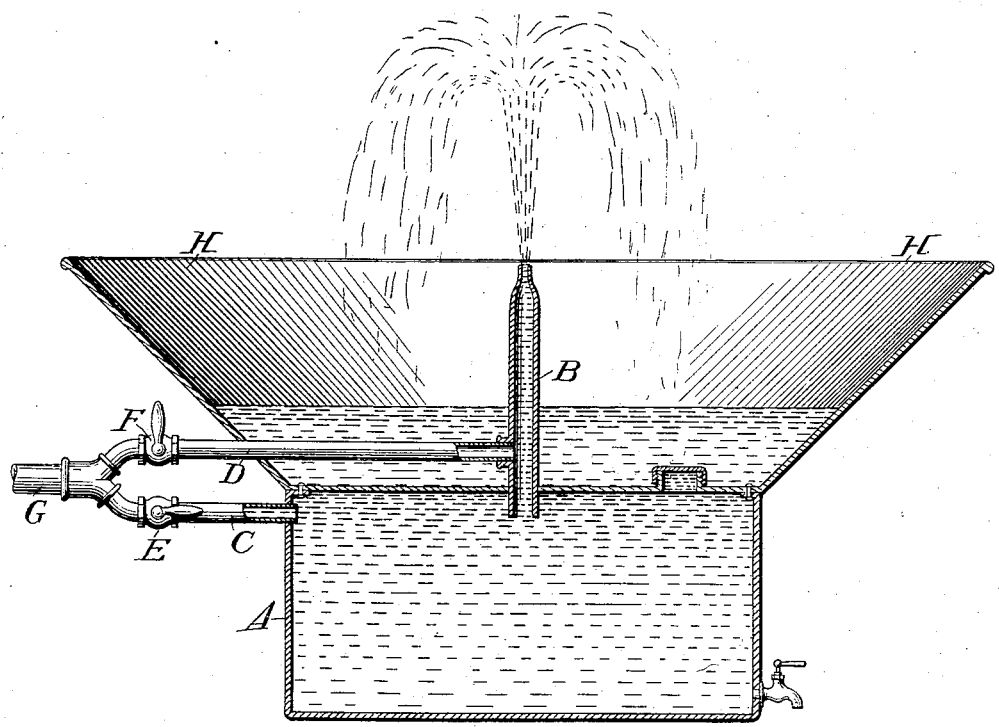
Witnesses:
Lou Hawes
Dell Hawes
Inventor:
George Wellington Hawes
THE NORRIS PETERS CO., PHOTO-LITHO., WASHINGTON, D. C.

No. 735,017. Patented July 28, 1903.

UNITED STATES PATENT OFFICE.

GEORGE WELLINGTON HAWES, OF MILBANK, SOUTH DAKOTA.

FOUNTAIN.

SPECIFICATION forming part of Letters Patent No. 735,017, dated July 28, 1903.

Application filed March 30, 1903. Serial No. 150,339. (No model.)

*To all whom it may concern:*

Be it known that I, GEORGE WELLINGTON HAWES, a citizen of the United States, residing at Milbank, in the county of Grant, in the State of South Dakota, have invented a new and useful fountain by which water flowing from a common source direct to and out at the nozzle of the fountain may be diverted from its direct course to the nozzle and made to flow through a closed receptacle, which may form a portion of the base of the fountain, thence out at the nozzle, and vice versa, and the direct flow may again be resumed by merely closing one valve and opening another, of which the following is a specification.

The closed receptacle is intended to contain coloring-matter or any desired soluble substance that the water will take up.

I attain these objects by the construction of a fountain as shown in the accompanying drawing.

The figure represents the fountain complete.

The base A is a receptacle for soluble substances to be taken up by water flowing into and through it from the pipe G, through the valve E and pipe C, and out at the nozzle B, the valve E being open and the valve F closed. When a direct stream of water unmixed with substances in the receptacle A is desired, the valve E is closed and the valve F opened.

What I claim as my invention, and desire to secure by Letters Patent, is—

In a fountain, the combination of the pipes C, and D, having connection with the main source at G, and the valves E, and F, with the receptacle A, and the nozzle B, for the purposes stated and substantially as set forth.

GEORGE WELLINGTON HAWES.

Witnesses:
LOU HAWES,
GEO. L. HAWES.